(12) United States Patent
Tobita et al.

(10) Patent No.: US 7,034,102 B2
(45) Date of Patent: Apr. 25, 2006

(54) POLYLACTIC ACID RESIN COMPOSITION AND MOLDED ARTICLE THEREOF, AND PROCESS OF PRODUCING THE MOLDED ARTICLE

(75) Inventors: Etsuo Tobita, Saitama (JP); Naoshi Kawamoto, Saitama (JP); Tsuyoshi Urushihara, Saitama (JP); Hisashi Okuyama, Toyota (JP); Takeshi Kanamori, Toyota (JP)

(73) Assignees: Asahi Denka Co., Ltd., Tokyo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/831,124

(22) Filed: Apr. 26, 2004

(65) Prior Publication Data

US 2004/0214983 A1 Oct. 28, 2004

(30) Foreign Application Priority Data

Apr. 25, 2003 (JP) ............................ 2003-122225
May 29, 2003 (JP) ............................ 2003-152657
May 29, 2003 (JP) ............................ 2003-152658

(51) Int. Cl.
*C08G 63/08* (2006.01)
(52) U.S. Cl. ........................ 528/354; 525/450; 264/234
(58) Field of Classification Search ................ 528/354, 528/503; 264/234; 525/450
See application file for complete search history.

(56) References Cited

U.S. PATENT DOCUMENTS 5,180,765 A 1/1993 Sinclair
6,111,060 A 8/2000 Gruber et al.

FOREIGN PATENT DOCUMENTS

| EP | 0 683 207 | 11/1995 |
|---|---|---|
| EP | 0 780 428 | 6/1997 |
| JP | A-60-086156 | 5/1985 |
| JP | A-04-220456 | 8/1992 |
| JP | A-05-070696 | 3/1993 |
| JP | A-6-504799 | 6/1994 |
| JP | A-7-504939 | 6/1995 |
| JP | A-08-193165 | 7/1996 |
| JP | A-09-278991 | 10/1997 |
| JP | A-10-087975 | 4/1998 |
| JP | A-10-158370 | 6/1998 |
| JP | A-11-005849 | 1/1999 |
| JP | 2001-98104 | 4/2001 |
| WO | WO 90/01521 | 2/1990 |

*Primary Examiner*—Duc Truong
(74) *Attorney, Agent, or Firm*—Young & Thompson

(57) ABSTRACT

A polylactic acid resin composition comprising 100 parts by weight of a polylactic acid, (A) 0 to 10 parts by weight of a phenol antioxidant, and (B) 0.01 to 10 parts by weight of at least one amide compound selected from the group consisting of (b-1) an acyclic amide, (b-2) a cyclic amide, (b-3) an acyclic hydrazide, and (b-4) a cyclic hydrazide or (b-5) a compound represented by formula (P):

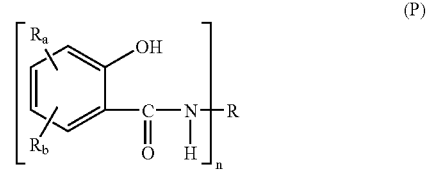

wherein $R_a$ and $R_b$ each represent a hydrogen atom, a hydroxyl group, an alkyl group having 1 to 8 carbon atoms, an alkoxy group having 1 to 8 carbon atoms or an aryl group having 6 to 18 carbon atoms, or they are connected to each other to form a ring to make a condensed ring having a total carbon-atom number of 10 to 18; R represents a single bond, an n-valent hydrocarbon group having 2 to 30 carbon atoms, an n-valent heterocyclic group or a group of formula:

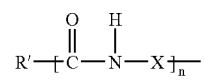

wherein R' represents an n-valent hydrocarbon group having 1 to 30 carbon atoms or an n-valent heterocyclic group; X represents a single bond or an alkylene group having 1 to 20 carbon atoms; and n represents 1, 2 or 3, and n represents 1, 2 or 3.

5 Claims, No Drawings

POLYLACTIC ACID RESIN COMPOSITION AND MOLDED ARTICLE THEREOF, AND PROCESS OF PRODUCING THE MOLDED ARTICLE

FIELD OF THE INVENTION

This invention relates to a polylactic acid resin composition producing high impact strength and high heat resistance molded articles with good moldability, a heat resistant molded article obtained from the polylactic acid resin composition, and a process of producing the heat resistant molded article.

BACKGROUND OF THE INVENTION

Today, environmentally biodegradable polymers and biodegradable molded articles made of such polymers have been demanded from the viewpoint of environmental conservation. Active studies have been directed to aliphatic polyesters as biodegradable polymers. Lactic acid polymers, in particular, have a sufficiently high melting point, which ranges 140° to 180° C., and exhibit excellent transparency and are therefore highly expected for use as a packaging material, a transparent molded article, etc.

Containers obtained by injection molding, for example, of lactic acid polymers are rigid enough but poor in heat resistance and, in some cases, poor in both heat resistance and impact resistance. Lactic acid polymer molded articles such as packaging containers therefore have limited application because of lack of safety against hot water or microwaving.

In order to obtain heat-resistant lactic acid polymer molded articles, it has been necessary to take a long time for mold cooling or anneal the molded articles thereby to let the resin highly crystallize. However, prolonged cooling is impractical and tends to result in insufficient crystallization, and annealing after molding is liable to deform molded articles during crystallization.

It is generally known that crystallization of a resin can be accelerated by addition of a nucleating agent. For example, JP-A-60-86156 teaches that crystallization of polyethylene terephthalate is accelerated by adding fine powder of a totally aromatic polyester composed mainly of terephthalic acid and resorcin units as a nucleating agent.

Addition of additives including a nucleating agent to a biodegradable polymer is described in JP-A-5-70696, JP-T-5-504731 (WO 90/001521), U.S. Pat. No. 5,180,765, JP-T-6-504799, JP-A-8-193165, JP-A-4-220456, JP-T-7-504939, JP-A-9-278991, JP-A-10-87975, and JP-A-11-5849.

JP-A-5-70696 supra discloses a material of plastic containers that comprises a biodegradable polymer, such as poly(3-hydroxybutyrate-co-3-hydroxyvalerate), polycaprolactone or polylactic acid, and 10 to 40% by weight of calcium carbonate or talc having an average particle size of 20 μm or smaller. This technique aims to accelerate biodegradation of biodegradable plastic waste by addition of a large amount of the inorganic filler but not to improve heat resistance of a biodegradable polymer molded article by crystallization.

JP-T-5-504731 (WO 90/001521) supra teaches that hardness, strength and temperature resistance of thermoplastic polylactides can be varied by addition of an inorganic filler such as silica or kaolinite. In a working example given in the publication, an L-lactide/DL-lactide copolymer was blended with 5 wt % calcium lactate on a heated mill roll at 170° C. for 5 minutes to obtain a sheet. The sheet was stiff, strong, and hazy and revealed a substantial increase in crystallinity.

U.S. Pat. No. 5,180,765 supra describes that lactic acid or a lactic acid oligomer is useful as a plasticizer of polylactic acid, serving to reduce the glass transition temperature and impart flexibility.

JP-T-6-504799 supra recites lactates and benzoates as a nucleating agent to be compounded into a biodegradable composition containing polylactic acid. In working examples of the publication, a polylactide copolymer compound containing 1% calcium lactate was injection molded in a mold kept at about 85° C. for a retention time of 2 minutes and, because of insufficient crystallinity, subjected to annealing at about. 110° to 135° C. before removal from the mold.

In fact, JP-A-8-193165 supra mentions as follows. When the inventors tried to injection mold a lactic acid polymer blended with a commonly employed nucleating agent, such as talc, silica or calcium lactate, the crystallization was so slow, and the resulting molded article was too brittle for practical use. The inventors conclude that a lactic acid polymer compound containing such a common additive is slow in crystallization in general molding, such as injection molding, blow molding or compression molding, only to provide a molded article with a low service heat resistance (100° C. or lower) and insufficient impact resistance, and is therefore limited in applicability.

JP-A-4-220456 supra describes that addition of polyglycolic acid and/or a derivative thereof to poly(L-lactide) as a nucleating agent increases the rate of crystallization thereby to shorten the injection molding cycle time and to give molded articles with improved mechanical properties. It is mentioned that the crystallinity achieved in injection molding followed by 60 second cooling was 22.6% without the aid of the nucleating agent but increased to 45.5% with the aid of the nucleating agent. However, JP-A-8-193165 supra reports that a lactic acid polymer containing no nucleating agent failed to be injection molded under such a mold temperature condition as referred to in JP-A-4-220456, i.e., at a mold temperature not lower than the glass transition temperature.

JP-T-7-504939 supra proposes adding to a polylactide mixture an effective amount of a stabilizer for suppressing depolymerization at or above the glass transition temperature. Such a stabilizer includes antioxidants, dehydrators, desiccants, and catalyst deactivators. The proposed catalyst deactivators include alkyl hydrazines, aryl hydrazines, amides, cyclic amides, hydrazones, carboxylic acid hydrazides, bisacylated hydrazine derivatives, and heterocyclic compounds, with bis[3-(3,5-di-t-but-yl-4-hydroxyphenyl)propionic acid] hydrazide being mentioned as a preferred one. According to this technique, it is true that depolymerization is inhibited in a molten state. However, it turned out that addition of bis[3-(3,5-di-t-butyl-4-hydroxyphenyl)propionic acid] hydrazide failed to provide a resin composition that could be molded under conditions employed for general-purpose resins to produce molded articles with high crystallinity and excellent transparency. In short, catalyst deactivation made no contribution to reduction in molding cycle time.

JP-A-9-278991, JP-A-10-87975, and JP-A-11-5849 supra propose adding an aromatic or aliphatic carboxylic acid amide compound to a polylactic acid or an aliphatic polyester to obtain molded articles excellent in crystallinity, transparency, and heat resistance. Nevertheless, actual experimentation revealed that the resin composition could not be molded by injection molding, etc. under cycle conditions applied to general-purpose resins, proving it difficult to put the technique into practice.

JP-A-10-158370 describes that a phenol antioxidant, such as 1,3,5-tris(3,5-di-t-butyl-4-hydroxybenzyl)isocyanurate, is effective in stabilizing a polylactic acid.

SUMMARY OF THE INVENTION

An object of the present invention is to solve the above-described problems associated with conventional techniques and to provide a polylactic acid resin composition capable of producing high heat resistance and high impact strength molded articles with good moldability, a heat resistant molded article obtained from the polylactic acid resin composition, and a process of producing the heat resistant molded article.

The above object of the invention is accomplished by a polylactic acid resin composition comprising 100 parts by weight of a polylactic acid, (A) 0 to 10 parts by weight of a phenol antioxidant, and (B) 0.01 to 10 parts by weight of at least one amide compound selected from the group consisting of (b-1) an acyclic amide, (b-2) a cyclic amide, (b-3) an acyclic hydrazide, and (b-4) a cyclic hydrazide or (b-5) a compound represented by formula (P):

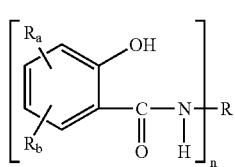

wherein $R_a$ and $R_b$ each represent a hydrogen atom, a hydroxyl group, an alkyl group having 1 to 8 carbon atoms, an alkoxy group having 1 to 8 carbon atoms or an aryl group having 6 to 18 carbon atoms, or they are connected to each other to form a ring to make a condensed ring having a total carbon atom number of 10 to 18; R represents a single bond, an n-valent hydrocarbon group having 2 to 30 carbon atoms, an n-valent heterocyclic group or a group of formula:

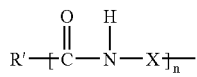

wherein R' represents an n-valent hydrocarbon group having 1 to 30 carbon atoms or an n-valent heterocyclic group; X represents a single bond or an alkylene group having 1 to 20 carbon atoms; and n represents 1, 2 or 3, and n represents 1, 2 or 3.

It is preferred that the content of component (A) in the polylactic acid resin composition be 0.01 to 10 parts by weight.

It is preferred that the amide compound be a heterocyclic compound represented by any one of formulae (I) through (VI):

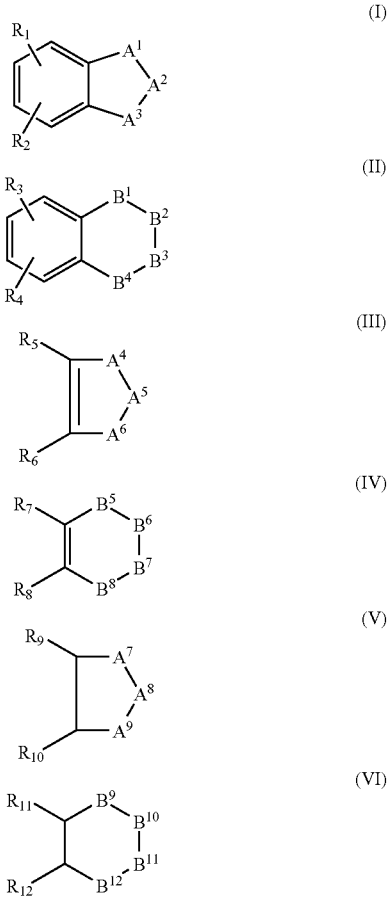

wherein $A^1$, $A^2$, $A^3$, $A^4$, $A^5$, $A^6$, $A^7$, $A^8$, $A^9$, $B^1$, $B^2$, $B^3$, $B^4$, $B^5$, $B^6$, $B^7$, $B^8$, $B^9$, $B^{10}$, $B^{11}$, and $B^{12}$ each represent —CH$_2$—, —C(=O)—, —C(=S)—, —NH—, —NR$_{13}$— or —S(=O)$_2$—; $R_1$, $R_2$, $R_3$, $R_4$, $R_5$, $R_6$, $R_7$, $R_8$, $R_9$, $R_{10}$, $R_{11}$, and $R_{12}$ each represent a hydrogen atom, a halogen atom, a hydroxyl group, or such groups having 1 to 18 carbon atoms as an alkyl group, an alkenyl group, an alkynyl group, an alkoxy group, a cycloalkyl group and an aryl group; $R_{13}$ represents —NH$_2$, —NHR$_{14}$, —NHC(=O)—R$_{15}$, or such groups having 1 to 18 carbon atoms as an alkyl group, a cycloalkyl group, an alkenyl group and an aryl group; and $R_{14}$ and $R_{15}$ each represent an alkyl group, a cycloalkyl group, an alkenyl group or an aryl group each having 1 to 18 carbon atoms; provided that at least one of $A^1$, $A^2$, and $A^3$ is —C(=O)— or —C(=S)—, at least one of $A^1$, $A^2$, and $A^3$ is —NH— or —NR$_{13}$—, at least one of $A^4$, $A^5$, and $A^6$ is —C(=O)— or —C(=S)—, at least one of $A^4$, $A^5$, and $A^6$ is —NH— or —NR$_{13}$—, at least one of $A^7$, $A^8$, and $A^9$ is —C(=O)— or —C(=S)—, at least one of $A^7$, $A^8$, and $A^9$ is —NH— or —NR$_{13}$—, at least one of $B^1$, $B^2$, $B^3$, and $B^4$ is —C(=O)— or —C(=S)—, at least one of $B^1$, $B^2$, $B^3$, and $B^4$ is —NH— or —NR$_{13}$—, at least one of $B^5$, $B^6$, $B^7$, and $B^8$ is —C(=O)— or —C(=S)—, at least one of $B^5$, $B^6$, $B^7$, and $B^8$ is —NH— or —NR$_{13}$—, at least one of $B^9$, $B^{10}$, $B^{11}$, and $B^{12}$ is —C(=O)— or —C(=S)—, and at least one of $B^9$, $B^{10}$, $B^{11}$, and $B^{12}$ is —NH— or —NR$_{13}$—.

It is preferred that component (B) be the compound represented by formula (P).

It is also preferred that the amide compound have a salicylamine structure.

It is also preferred that the amide compound have a condensed heterocyclic structure.

It is preferred that the amide compound have a melting point of 300° C. or higher.

It is also preferred that the amide compound be dodecanedioic acid bis(2-(2-hydroxybenzoyl)hydrazide).

It is also preferred that the amide compound be phthalic hydrazide.

It is also preferred that the amide compound be an ethylenebisalkylamide.

It is also preferred that the polylactic acid resin composition further comprise 0.01 to 40 parts by weight of magnesium silicate hydrate (talc).

The magnesium silicate hydrate (talc) preferably has an average particle size of 10 μm or smaller.

The object of the invention is also accomplished by a heat resistant polylactic acid resin molded article obtained by molding the polylactic acid resin composition of the present invention.

The object of the present invention is also achieved by a process of producing a heat resistant polylactic acid resin molded article. The process comprises melting the polylactic acid resin composition of the invention and molding the molten composition while crystallizing the resin composition in a mold set at a temperature ranging from the glass transition temperature to the crystallization initiation temperature measured with a differential scanning calorimeter (DSC).

DETAILED DESCRIPTION OF THE INVENTION

The polylactic acid (or lactic acid polymer) used in the present invention includes lactic acid homopolymers, lactic acid copolymers, and polyblends of a lactic acid homopolymer and a lactic acid copolymer. A polyblend mainly comprising the polylactic acid is also useful as long as the crystallizing properties of the polylactic acid resin composition are not impaired.

The polylactic acid usually has a polystyrene equivalent weight average molecular weight (Mw) of 50,000 to 500,000, preferably 100,000 to 250,000, measured by gel permeation chromatography (GPC). With an Mw less than 50,000, it is hard to obtain molded articles with physical properties necessary for practical use. Polylactic acids with an Mw more than 500,000 tend to have poor moldability.

The L-lactic acid unit to D-lactic acid unit (L/D) molar ratio of the polylactic acid is not particularly limited and can range from 100/0 to 0/100. Where a resin composition having a high melting point is demanded, it is advisable for the polylactic acid to contain 75 mol % or more of either one of the L- or D-lactic acid units. Where a further increased melting point is desired, it is preferred that the content of either L- or D-lactic acid unit be 90 mol % or higher.

The polylactic acid copolymer as referred to above is a copolymer of a lactic acid or lactide monomer with a copolymerizable comonomer. The comonomer includes dicarboxylic acids, polyhydric alcohols, and hydroxycarboxylic acids, which have at least two ester-forming functional groups; lactones; and various polyesters, polyethers, and polycarbonates containing such structures.

The dicarboxylic acids include succinic acid, adipic acid, azelaic acid, sebacic acid, terephthalic acid, and isophthalic acid.

The polyhydric alcohols include aromatic polyhydric alcohols, such as bisphenol-ethylene oxide adducts; aliphatic polyhydric alcohols, such as ethylene glycol, propylene glycol, butanediol, hexanediol, octanediol, glycerol, sorbitol, trimethylolpropane, and neopentyl glycol; and ether glycols, such as diethylene glycol, triethylene glycol, polyethylene glycol, and polypropylene glycol.

The hydroxycarboxylic acids include glycolic acid, hydroxybutylcarboxylic acid, and those described in JP-A-6-184417.

The lactones include glycolide, ε-caprolactone glycolide, ε-caprolactone, ε-propiolactone, δ-butyrolactone, β-butyrolactone, γ-butyrolactone, pivalolactone, and δ-valerolactone.

The polylactic acid that can be used in the present invention is not restricted by process of synthesis and can be synthesized by any known processes including direct dehydration polycondensation of a lactic acid monomer and ring-opening polymerization of a lactide (i.e., a cyclic dimer of lactic acid) as disclosed, e.g., in JP-A-7-33861, JP-A-59-96123, and *Polymer Preprints, Japan*, vol. 44, 3198–3199.

The monomer for direct dehydration polycondensation can be any of L-lactic acid, D-lactic acid, DL-lactic acid, and a mixture thereof. The lactide for ring-opening polymerization includes L-lactide, D-lactide, DL-lactide, meso-lactide, and a mixture thereof.

Synthesis, purification, and polymerization of the lactide can be carried out in accordance with the teachings in U.S. Pat. No. 4,057,537, EP 261572A, *Polymer Bulletin*, 14, 491–495 (1985), and *Macromol. Chem.*, 187, 1611–1628 (1986).

In carrying out polymerization to obtain the polylactic acid, any known catalyst for polymerization for preparing a polylactic acid can be used. Examples of useful catalysts include tin compounds, e.g., tin lactate, tin tartrate, tin dicaprylate, tin dilaurate, tin dipalmitate, tin distearate, tin dioleate, tin α-naphthoate, tin β-naphthoate, and tin octylate, tin powder, tin oxide, zinc powder, zinc halides, zinc oxide, organozinc compounds, titanium compounds, e.g., titanium tetrapropoxide, zirconium compounds, e.g., zirconium isopropoxide, antimony compounds, e.g., antimony trioxide, bismuth compounds, e.g., bismuth (III) oxide, and aluminum compounds, e.g., aluminum oxide and aluminum isopropoxide.

Preferred of these catalysts are tin and tin compounds for their activity. In ring-opening polymerization, for example, the catalyst is usually used in an amount of about 0.001 to 5% by weight based on a lactide.

The temperature of polymerization in the presence of the catalyst is usually from 100° to 220° C., while varying depending on the catalyst used. Two-stage polymerization as described, e.g., in JP-A-7-247345 is also a preferred embodiment.

The polyblend mainly comprising the polylactic acid includes a mixture prepared by mixing a lactic acid homopolymer and/or a lactic acid copolymer with at least one aliphatic polyester other than polylactic acids and melting the mixture. Mixing an aliphatic polyester into a polylactic acid imparts improved flexibility and impact resistance to the resulting molded articles. The aliphatic polyester is usually added in an amount of about 10 to 100 parts by weight per 100 parts by weight of the lactic acid homopolymer and/or the lactic acid copolymer.

The aliphatic polyester can be used either individually or as a combination of two or more. The aliphatic polyester includes those composed of an aliphatic carboxylic acid component and an aliphatic alcohol component and aliphatic hydroxycarboxylic acid polymers obtained by ring-opening polymerization of cyclic anhydrides such as E-caprolactone. These aliphatic polyesters can be produced by, for example, direct polymerization or indirect polymerization, i.e., chain extension of polyester oligomers by use of a chain extender, etc. The aliphatic polyester may be a copolymer or a polyblend with other resins as long as it is composed mainly of the above-described aliphatic components.

The aliphatic polyester is preferably one composed of an aliphatic dicarboxylic acid component and an aliphatic diol component. The aliphatic dicarboxylic acid includes succinic acid, adipic acid, suberic acid, sebacic acid, dodecanoic acid, and an anhydride or derivative thereof. The aliphatic diol component includes glycols, such as ethylene glycol, butanediol, hexanediol, octanediol, and cyclohexanedimethanol, and derivatives thereof. It is preferred for both of the aliphatic dicarboxylic acid and the aliphatic diol to contain an alkylene group, a cyclo ring group or a cycloalkylene group each having 2 to 10 carbon atoms. The aliphatic polyester is preferably prepared by polycondensation of at least one of the aliphatic dicarboxylic acids and at least one of the aliphatic diols each selected from the above-recited examples.

In order to introduce a branched structure into the aliphatic polyester, which is effective to increase the melt viscosity of the resin composition, a carboxylic acid, alcohol, or hydroxycarboxylic acid monomer having tri- or higher functionality may be used to make the polymer. It should be noted, however, that such a polyfunctional monomer, if used in a large proportion, is apt to introduce a crosslinked structure which may make the polymer non-thermoplastic or form very highly crosslinked microgel in parts. Therefore, the polyfunctional monomer should be used in such a small proportion that does not greatly influence the chemical and physical properties of the polymer. Usable polyfunctional monomers include malic acid, tartaric acid, citric acid, trimellitic acid, pyromellitic acid, pentaerythritol, and trimethylolpropane.

The direct polymerization, one of the techniques for preparing the aliphatic polyester, is a method in which selected monomers are polymerized while removing produced water or water present in the monomers. The indirect polymerization is another technique for obtaining the aliphatic polyester, in which selected monomers are oligomerized, and the molecular weight of the resulting oligomer is increased by using a small amount of a chain extender, such as diisocyanate compounds (e.g., hexamethylene diisocyanate, isophorone diisocyanate, xylylene diisocyanate, and diphenylmethane diisocyanate). A method in which a carbonate compound is used to produce an aliphatic polyester carbonate is also available.

If desired, the polylactic acid can be blended with other general-purpose resins to have improved impact resistance and the like. General-purpose resins with elasticity, such as ethylene-propylene copolymer rubber and ethylene-propylene-diene copolymer rubber, are preferred for that purpose.

The phenol antioxidant that can be used as component (A) includes, but are not limited to, 2,6-di-t-butyl-p-cresol, 2,6-diphenyl-4-octadecyloxyphenol, stearyl (3,5-di-t-butyl-4-hydroxyphenyl)propionate, distearyl (3,5-di-t-butyl-4-hydroxybenzyl)phosphonate, tridecyl.3,5-di-t-butyl-4-hydroxybenzylthioacetate, thiodiethylenebis [(3,5-di-t-butyl-4-hydroxyphenyl)propionate], 4,4'-thiobis(6-t-butyl-m-cresol), 2-octylthio-4,6-di(3,5-di-t-butyl-4-hydroxyphenoxy)-s-triazine, 2,2'-methylenebis(4-methyl-6-t-butylphenol), bis[3,3-bis(4-hydroxy-3-t-butylphenyl) butyric acid] glycol ester, 4,4'-butylidenebis(2,6-di-t-butylphenol), 4,4'-butylidenebis(6-t-butyl-3-methylphenol), 2,2'-ethylidenebis(4,6-di-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl]terephthalate, 1,3,5-tris(2,6-dimethyl-3-hydroxy-4-t-butylbenzyl) isocyanurate, 1,3,5-tris(3,5-di-t-butyl-4-hydroxybenzyl) isocyanurate, 1,3,5-tris(3,5-di-t-butyl-4-hydroxybenzyl)-2, 4,6-trimethylbenzene, 1,3,5-tris[(3,5-di-t-butyl-4-hydroxyphenyl)propionyloxyethyl]isocyanurate, tetrakis [methylene-3-(3',5'-di-t-butyl-4'-hydroxyphenyl) propionate]methane, 2-t-butyl-4-methyl-6-(2-acryloyloxy-3-t-butyl-5-methylbenzyl)phenol, 3,9-bis[2-(3-t-butyl-4-hydroxy-5-methylhydrocinnamoyloxy)-1,1-dimethylethyl]-2,4,8,10-tetraoxaspiro[5.5]undecane, and triethylene glycol bis[α-(3-t-butyl-4-hydroxy-5-methylphenyl)propionate]. In particular, 1,3,5-tris(2,6-dimethyl-3-hydroxy-4-t-butylbenzyl)isocyanurate, 1,3,5-tris(3,5-di-t-butyl-4-hydroxybenzyl) isocyanurate, 1,3,5-tris(3,5-di-t-butyl-4-hydroxybenzyl)-2, 4,6-trimethylbenzene, 1,3,5-tris[(3,5-di-t-butyl-4-hydroxyphenyl)propionyloxyethyl]isocyanurate, and tetrakis [methylene-3-(3',5'-di-t-butyl-4'-hydroxyphenyl) propionate]methane are preferred for providing a polylactic acid resin composition having a high crystallization peak temperature, i.e., a high latent heat of crystallization, and is therefore excellent in molding cycle characteristics.

The phenol antioxidant is used in an amount of 0 to 10 parts by weight, preferably 0.01 to 10 parts by weight, still preferably 0.03 to 5 parts by weight, particularly preferably 0.05 to 3 parts by weight, per 100 parts by weight of the polylactic acid resin. If used in amounts exceeding 10 parts, the resulting resin composition will have insufficient mechanical strength and be colored.

The polylactic acid resin composition of the invention contains the above-described component (B) as a nucleating agent.

The acyclic amide as component (b-1) includes one between an aliphatic monoamine and an aliphatic monocarboxylic acid, one between an aliphatic diamine and an aliphatic monocarboxylic acid, one between an aliphatic monoamine and an aliphatic dicarboxylic acid, one between an aromatic monoamine and an aliphatic monocarboxylic acid, one between an aromatic diamine and an aliphatic monocarboxylic acid, one between an aromatic monoamine and an aliphatic dicarboxylic acid, one between an aliphatic monoamine and an aromatic monocarboxylic acid, one between an aliphatic diamine and an aromatic monocarboxylic acid, one between aliphatic monoamine and an aromatic dicarboxylic acid, one between an aromatic monoamine and an aromatic monocarboxylic acid, one between an aromatic diamine and an aromatic monocarboxylic acid, one between an aromatic monoamine and an aromatic dicarboxylic acid, and one between an aromatic acid and an amine compound substituted with a heterocyclic ring. Examples of the acyclic amide (b-1) are stearyl stearamide, distearyl adipamide, ethylenebisoctylamide, ethylenebisdecanamide, ethylenebislauramide, ethylenebismyristamide, ethylenebisplamitamide, ethylenebisstearamide, ethylenebisoleamide, stearyl benzamide, stearyl salicylamide, biphenyl distearyl 4,4'-dicarboxamide, ethylenebis(4-t-butylbenzamide), stearic acid anilide, adipic acid bisanilide, phenylenebisstearamide, benzoic acid anilide, phthalic acid bisanilide, and phenylenebisbenzamide.

The cyclic amide as component (b-2) includes the above-described compounds represented by formulae (I) through (VI) supra.

In formulae (I) through (VI), the alkyl group having 1 to 18 carbon atoms as represented by $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ includes methyl, ethyl, propyl, isopropyl, butyl, sec-butyl, tert-butyl, pentyl, tert-pentyl, hexyl, heptyl, octyl, isooctyl, tert-octyl, 2-ethylhexyl, nonyl, isononyl, decyl, isodecyl, undecyl, dodecyl, tridecyl, tetradecyl, pentadecyl, hexadecyl, heptadecyl, and octadecyl. The alkenyl group includes vinyl, propenyl, butenyl, octenyl, and oleyl. The cycloalkyl group includes cyclopentyl, cyclohexyl, and cycloheptyl.

In formulae (I) through (VI), the alkoxy group having 1 to 18 carbon atoms as represented by $R_1$, $R_2$, $R_3$, $R_4$, $R_5$, $R_6$, $R_7$, $R_8$, $R_9$, $R_{10}$, $R_{11}$, and $R_{12}$ includes those corresponding to the above-recited alkyl groups.

In formulae (I) through (VI), the halogen atom as represented by $R_1$, $R_2$, $R_3$, $R_4$, $R_5$, $R_6$, $R_7$, $R_8$, $R_9$, $R_{10}$, $R_{11}$, and $R_{12}$ includes fluorine, chlorine, and bromine.

In formulae (I) through (VI), the aryl group having 6 to 18 carbon atoms as represented by $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, and $R_{15}$ includes phenyl, naphthyl, and biphenyl.

More specifically, the cyclic amide compounds of formulae (I) to (VI) include, but are not limited to, the following compound Nos. 1 to 15:

Compound No. 1:

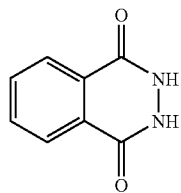

Compound No. 2:

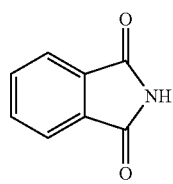

Compound No. 3:

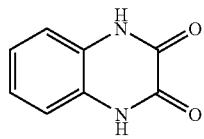

Compound No. 4:

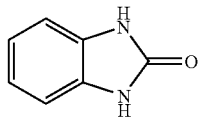

Compound No. 5:

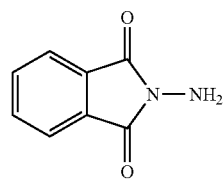

Compound No. 6:

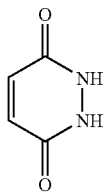

Compound No. 7:

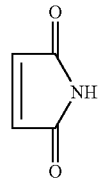

Compound No. 9:

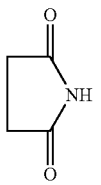

Compound No. 10:

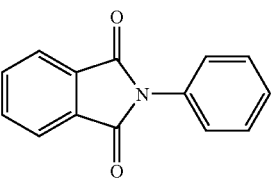

Compound No. 11:

Compound No. 12:

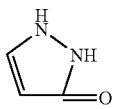

Compound No. 13:

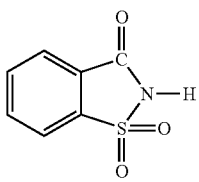

Compound No. 14:

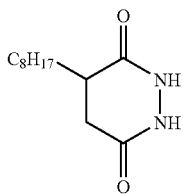

Compound No. 15:

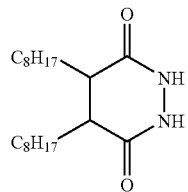

The acyclic hydrazide as component (b-3) includes those represented by formulae (VII) and (VIII):

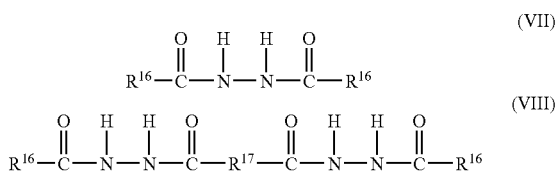

wherein $R^{16}$ represents a monocarboxylic acid residue; and $R^{17}$ represents a dicarboxylic acid residue.

The monocarboxylic acid residue $R^{16}$ includes those derived from fatty acids such as octylic acid, decanoic acid, lauric acid, myristic acid, palmitic acid, stearic acid, behenic acid, and oleic acid; and aromatic acids such as benzoic acid, 4-butylbenzoic acid, salicylic acid, and naphthoic acid. The dicarboxylic acid residue $R^{17}$ includes those derived from succinic acid, adipic acid, azelaic acid, sebacic acid, terephthalic acid, and isophthalic acid.

The cyclic hydrazide as component (b-4) includes the compounds represented by formulae (I) to (VI) wherein the ring contains an additional group —NH— or —$NR_{13}$— next to the essential group —NH— or —$NR_{13}$—, such as phthalic hydrazide.

In formula (P), the alkyl group having 1 to 8 carbon atoms as represented by $R_a$ and $R_b$ includes methyl, ethyl, propyl, isopropyl, butyl, isobutyl, sec-butyl, tert-butyl, pentyl, tert-pentyl, hexyl, heptyl, octyl, tert-octyl, and 2-ethylhexyl. The alkoxy group having 1 to 8 carbon atoms as represented by $R_a$ and $R_b$ include those corresponding to the above-recited alkyl groups. The aryl group having 6 to 18 carbon atoms as represented by $R_a$ and $R_b$ includes phenyl, naphthyl, and biphenyl.

In formula (P), the condensed ring structure formed by $R_a$ and $R_b$ taken together and having a total carbon atom number of 10 to 18 includes naphthyl.

In formula (P), the n-valent hydrocarbon group having 2 to 30 carbon atoms as represented by R and the n-valent hydrocarbon group having 1 to 30 carbon atoms as represented by R' include those derived from straight-chain or branched, aliphatic saturated hydrocarbons, such as ethane, propane, butane, pentane, hexane, heptane, octane, nonane, decane, undecane, dodecane, tridecane, tetradecane, pentadecane, hexadecane, heptadecane, and octadecane; aliphatic unsaturated hydrocarbons, such as ethylene, propene, butene, butadiene, and dodecene; and aromatic hydrocarbons, such as benzene, naphthalene, anthracene, biphenyl, and terphenyl.

The heterocyclic ring as represented by R and R' includes those represented by formulae:

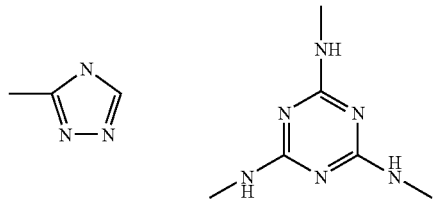

In formula (P), R is preferably a heterocyclic ring or a group shown below; and n is preferably 1 or 2.

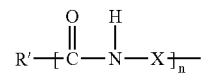

wherein R' is preferably an alkylene group having 2 to 22 carbon atoms.

The compounds represented by formula (P) include, but are not limited to, the following compound Nos. 16 to 25.

Compound No. 16:

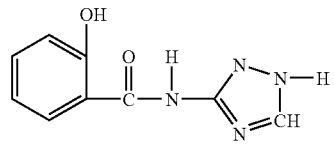

Compound No. 17:

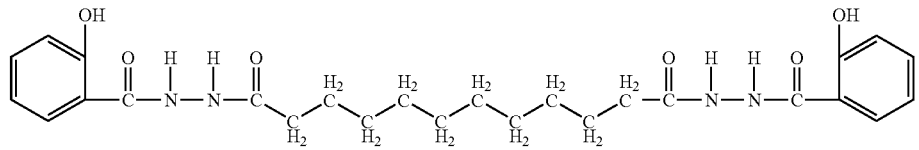

-continued
Compound No. 18:
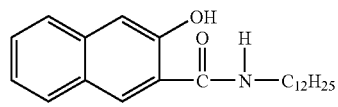
Compound No. 19:
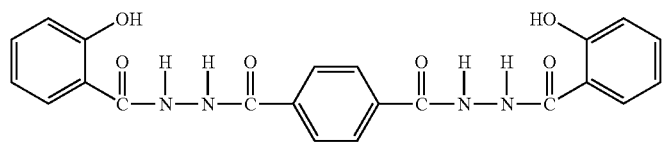
Compound No. 20:
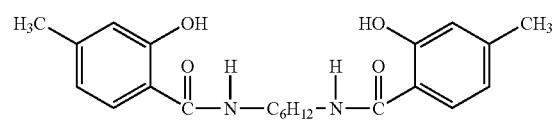
Compound No. 21:
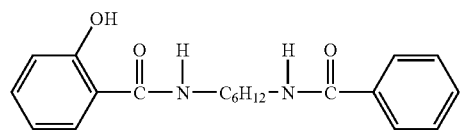
Compound No. 22
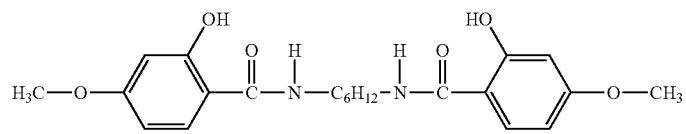
Compound No. 23:
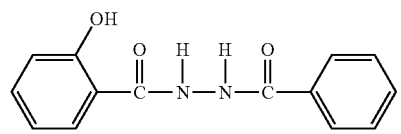
Compound No. 24
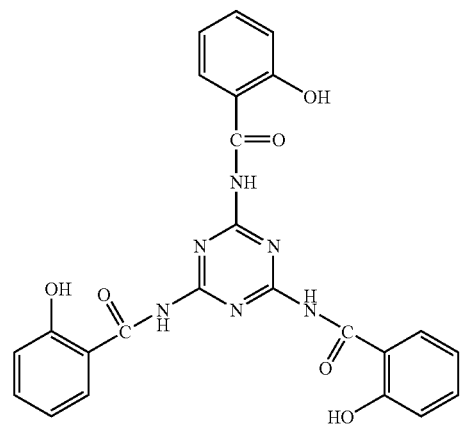

Compound No. 25:

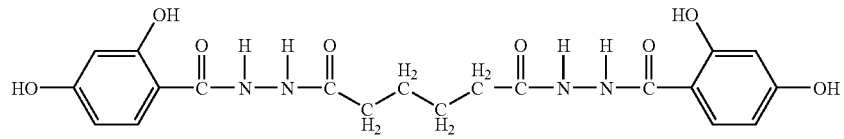

The polylactic acid resin composition of the present invention contains component (B) in an amount of 0.01 to 10 parts by weight, preferably 0.05 to 5 parts by weight, still preferably 0.1 to 3 parts by weight, per 100 parts by weight of the polylactic acid. Less than 0.01 part of component (B) produces insubstantial effects of addition. Addition of more than 10 parts of component (B) results in unfavorable phenomena such as bleed out.

It is preferred for the polylactic acid resin composition to further contain magnesium silicate hydrate (talc). Magnesium silicate hydrate to be added preferably has an average particle size of 10 μm or smaller, still preferably 1 to 5 μm. Magnesium silicate hydrate particles of 10 μm or smaller are more effective on acceleration of nucleation to enhance the improvement on heat resistance of moldings than those greater than 10 μm.

The magnesium silicate hydrate (talc) is preferably added in an amount of 0.01 to 40 parts by weight, still preferably 0.01 to 30 parts by weight, per 100 parts by weight of the polylactic acid. Addition of less than 0.01 part is not so effective. Addition of more than 40 parts not only results in an increased specific gravity of the resin composition but also tends to result in reduction of impact resistance.

If desired, the polylactic acid resin composition may furthermore contain other additives known in the art, such as plasticizers, antioxidants, heat stabilizers, ultraviolet absorbers, pigments, colorant, fillers, antistatics, metal soaps, waxes, parting agents, perfumes, lubricants, flame retardants, blowing agents, antimicrobials, antifungals, and nucleating agents other than those recited above as component (B).

The polylactic acid, components (A) and (B), and necessary additives including magnesium silicate hydrate (talc) are compounded into the polylactic acid resin composition by any known methods. For example, the polylactic acid in the form of powder or pellets is dry blended with the other components, or some of the additives are previously dry blended, and the resulting blend is dry blended with the other components. The dry blend may be further mixed in a roll mill, a Banbury mixer, a super mixer, etc. and kneaded in a single or twin screw extruder. The mixing and kneading are usually performed at about 150° to 300° C. The additives may be added during the stage of polymerization for preparing the polylactic acid. The additives may be added to the polylactic acid in the form of a master-batch, a concentrated premix of the additives.

The polylactic resin composition of the invention is used as a material for molding into various molded articles similarly to general plastics.

The heat resistant molded article according to the present invention, which is obtained by molding the polylactic acid resin composition of the invention, and the process according to the present invention, which is a preferred process for producing the molded article, will then be described.

A polylactic acid resin composition can be crystallized by, for example, a process comprising molding the composition and annealing the molded article at a crystallization temperature of the composition. The problem of this process is that the molded article is liable to deformation during annealing, i.e., crystallization. In order to settle the problem, the present invention proposes a process in which a mold of a molding machine filled with the polylactic acid resin composition is maintained at a temperature at which the composition is capable of crystallizing for a given period of time.

According to the process of the present invention, the polylactic acid resin composition is melted, and the molten composition is put into a mold of a molding machine set at a specific temperature and maintained there for a predetermined period of time, whereby the composition is molded while crystallizing. The temperature at which the mold is set (i.e., the mold temperature) is selected from a range in which the polylactic acid resin composition is capable of crystallization-, i.e., a range of from the glass transition temperature to the crystallization initiation temperature measured with a DSC. The mold temperature is preferably set within a range of from the crystallization end temperature to the crystallization initiation temperature. By virtue of component (B) as a nucleating agent, the polylactic acid resin composition of the invention completes crystallization in the mold to produce a polylactic acid resin molded article excellent in heat resistance and impact resistance.

A proper mold temperature varies depending on the kinds of the polylactic acid and additives and the like. Therefore, thermal properties of the polylactic acid resin composition (i.e., crystallization peak temperature, crystallization initiation temperature, glass transition temperature, and crystallization end temperature) are previously measured by DSC analysis, and a mold temperature is selected from the range of from the glass transition temperature to the crystallization initiation temperature, preferably the range of from the crystallization end temperature to the crystallization initiation temperature. With the mold temperature set within that range, the polylactic acid resin composition of the invention crystallizes easily to provide a molded article with good dimensional precision. Out of that range of the mold temperature, the resin composition is so slow in crystallization that an impractically prolonged solidification time will be needed in molding. The thermal properties measurement with a DSC can be carried out, for example, as follows. A pellet sample weighing 5 mg is heated from room temperature up to 200° C. at a rate of 50° C./min, maintained at that temperature for 5 minutes, and then cooled at a rate of 5° C./min. DSC analysis is conducted during the cooling.

The polylactic acid resin composition can be molded in the same manner as for ordinary resin molding materials, such as extrusion molding, injection molding, blow molding, vacuum forming, compression molding, and so forth, to easily produce various molded articles, such as sheets, rods, bottles, trays, etc.

The molded article of the polylactic acid resin composition of the invention exhibits high heat resistance. Heat resistance of a resin molded article can be quantitatively expressed in terms of deflection temperature under low load (0.45 MPa) in accordance with JIS K7207, test method A. Specifically, a specimen is set in a heating bath containing a heating medium. The temperature of the heating medium is elevated at constant rate with a flexural stress of 0.45 MPa applied to the specimen. The "deflection temperature under low load" is defined to be the temperature of the heating medium at which the specimen deflects by a specified distance. The deflection temperature under low load of the molded article according to the invention is appropriately adjustable according to the intended use of the article typically by changing the compounding ratio of the nucleating agent. It is desirable for the molded article to have a deflection temperature under low load of 80° C. or higher, preferably 90° C. or higher, still preferably 100° C. or higher, even for use as a part, for example, an appliance part, that is not exposed to a relatively high temperature.

The present invention will now be illustrated in greater detail with respect to Examples and Comparative Examples, but it should be understood that the invention is not construed as being limited thereto.

EXAMPLE 1 AND COMPARATIVE EXAMPLE 1

The components shown in Table 1 below were dry blended. The blend was melt kneaded in a twin screw extruder set at 200° C. for 4 minutes in average, extruded into strands, cooled in water, and cut into pellets to obtain a nucleating agent-containing polylactic acid resin compound.

The crystallization initiation temperature (Tic), crystallization peak temperature (Tpc), glass transition temperature (Tg), and heat of crystallization of the pellets were determined with a DSC (Diamond DSC, supplied by Perkin Elmer). DSC analysis was performed after heating 5 mg of the pellets from room temperature up to 200° C. at a rate of 50° C./min and maintaining the sample at 200° C. for 5 minutes and while cooling the molten sample at a rate of 5° C./min. The results of measurement are shown in Table 1.

The pellets were dried in vacuo at 80° C. to complete dryness and injection molded to prepare specimens for flexural test, Izod impact test, and heat resistance test. The mold was kept at 110° C., and the cooling time was set at 120 seconds.

The resulting specimens were tested to measure flexural strength and flexural modulus in accordance with JIS K7203, Izod impact strength in accordance with JIS K7110 (No. 1, test piece A), and deflection temperature under low load in accordance with JIS K7202 (method A). The results of measurements are shown in Table 1.

When the specimens as injection molded were removed from the mold, mold releasability (adhesion to the mold) and any deformation of the specimens were observed with the naked eye to grade the specimens A (neither adhesion to the mold nor deformation was observed.), B (the specimens were slightly liable to adhere to the mold, but no deformation was observed), C (the specimens were liable to adhere to the mold and showed apparent deformation.) or D (the specimens were difficult to remove due to adhesion to the mold and showed exceeding deformation). The results of grading are shown in Table 1.

The following is the particulars of the components indicated in Table 1

Polylactic acid: #5400", available from Toyota Motor Corp.; polystyrene equivalent weight average molecular weight: 160,000 by GPC.

Talc: Fine talc powder "Microace P-6", available from Nippon Talc Co., Ltd.

Compound No. 1-1 (component (B)): Adekastab CDA-1, available from Asahi Denka Co., Ltd.

Compound No. 1-2 (component (B)): Adekastab CDA-6, available from Asahi Denka Co., Ltd.

Bisamide: Sripax H, available from Nippon Kasei Chemical Co., Ltd.

TABLE 1

|  |  | Example | | | | Compa. Example | |
| --- | --- | --- | --- | --- | --- | --- | --- |
|  |  | 1-1 | 1-2 | 1-3 | 1-4 | 1-1 | 1-2 |
| Composition | polylactic Acid | 100 | 100 | 100 | 100 | 100 | 100 |
|  | Compound No. 1-1 | 1 | 2 |  |  |  |  |
|  | Compound No. 1-2 |  |  | 1 | 2 |  |  |
|  | Talc | 1 | 1 | 1 | 1 |  | 1 |
|  | Bisamide |  |  |  |  | 1 | 1 |
|  | Tic (° C.) | 140.0 | 140.2 | 137.7 | 140.2 | 125.0 | 128.2 |
|  | Tpc (° C.) | 129.5 | 128.6 | 127.5 | 132.0 | 118.3 | 117.6 |
|  | Crystallization Heat (J/g) | −45.5 | −44.8 | −45.4 | −46.2 | −43.9 | −43.2 |
|  | Tg (° C.) | 60.2 | 59.8 | 59.8 | 60.0 | 60.2 | 59.8 |
|  | Mold Release and Deformation | B | B | B | A | D | C |
|  | Flexural Strength (MPa) | 101.1 | 109.5 | 111.2 | 107.8 | 99.1 | 112.2 |
|  | Flexural Modulus (MPa) | 4736 | 4799 | 4731 | 4893 | 3685 | 3876 |
|  | Izod Impact Strength (kJ/m$^2$) | 4.6 | 5.4 | 8.6 | 7.2 | 6.9 | 5.5 |
|  | Deflection Temp. under LowLoad (° C.) | 134.5 | 137.4 | 135.5 | 137.0 | 102.3 | 111.3 |

As is apparent from the results in Table 1, the polylactic acid resin compositions of the present invention (Examples 1-1 to 1-4), which contain the specific amide compound as a nucleating agent, exhibit excellent moldability and undergo no deformation when released from the mold. It is also seen that the molded articles of the polylactic acid resin compositions of Examples 1-1 to 1-4 are excellent in heat resistance, flexural strength, flexural modulus, and Izod impact strength. In contrast, the comparative compositions containing a conventional bisamide nucleating agent (Comparative Examples 1-1 and 1-2) have poor molding properties despite the nucleating agent, and the resulting molded articles are inferior in heat resistance, flexural modulus, and Izod impact strength.

EXAMPLE 2

The components shown in Table 2 below were dry blended. The blend was melt kneaded in a twin screw extruder set at 200° C. for 4 minutes in average, extruded into strands, cooled in water, and cut into pellets to obtain a nucleating agent-containing polylactic acid resin compound.

The crystallization peak temperature (Tpc) and crystallization heat of the pellets were determined with a DSC (Diamond DSC, supplied by Perkin Elmer). DSC analysis was effected under the same conditions as in Example 1. The results of measurement are shown in Table 2.

The pellets were dried in vacuo at 80° C. to complete dryness and injection molded to prepare specimens for Izod impact test specified in JIS K7110 (No. 1, test piece A). The mold was kept at 110° C., and the cooling time was set at 120 seconds.

When the specimens as injection molded were removed from the mold, mold releasability and any deformation of the specimens were observed with the naked eye and graded A to D according to the same standards as in Example 1. The results of grading are shown in Table 2.

The following is the particulars of the components indicated in Table 2.

Polylactic acid: "#5400", available from Toyota Motor Corp.; polystyrene equivalent weight average molecular weight: 160,000 by GPC.

Talc: Fine talc powder "Microace P-6", available from Nippon Talc Co., Ltd.

Compound No. 2-1 (component (B)): Phthalic hydrazide (melting point: >300° C.)

Compound No. 2-2 (component (B)): Maleic hydrazide (melting point: >260° C.)

Compound 2-3 (component (B)): Saccharin (melting point: 230° C.)

TABLE 2

|  |  | Example | | |
|---|---|---|---|---|
|  |  | 2-1 | 2-2 | 2-3 |
| Composition | Polylactic Acid | 100 | 100 | 100 |
|  | Compound No. 2-1 | 1 | | |
|  | Compound No. 2-2 | | 1 | |
|  | Compound No. 2-3 | | | 1 |

TABLE 2-continued

|  | Example | | |
|---|---|---|---|
|  | 2-1 | 2-2 | 2-3 |
| Compa. Compound 1 | | | |
| Talc | 1 | 1 | 1 |
| Tpc (° C.) | 126 | 120 | 118 |
| Crystallization Heat (J/g) | −47 | −41 | −41 |
| Mold Release and Deformation | B | C | C |

It is apparently seen from Table 2 that the polylactic acid resin compositions of the invention, which contain the specific heterocyclic compound, exhibit excellent molding properties in injection molding and undergo no deformation on removal from mold (Examples 2-1 to 2-3).

EXAMPLE 3 AND COMPARATIVE EXAMPLE 3

The components shown in Table 3 below were dry blended. The blend was melt kneaded in a twin screw extruder set at 200° C. for 4 minutes in average, extruded into strands, cooled in water, and cut into pellets to obtain a nucleating agent-containing polylactic acid resin compound.

The crystallization peak temperature (Tpc) and crystallization heat of the pellets were determined with a DSC (Diamond DSC, supplied by Perkin Elmer). DSC analysis was performed after heating 5 mg of the pellets from room temperature up to 230° C. at a rate of 50° C./min and maintaining the sample at 230° C. for 10 minutes and while cooling the molten sample at a rate of 5° C./min. The results of measurement are shown in Table 3. A higher crystallization peak temperature (Tpc) indicates a shorter molding cycle time. A larger amount of crystallization heat means accelerated crystallization, resulting in a molded article with higher transparency.

The pellets were dried in vacuo at 80° C. to complete dryness and injection molded to prepare specimens for Izod impact test specified in JIS K7110 (No. 1, test piece A). The mold was kept at 110° C., and the cooling time was set at 120 seconds.

When the specimens as injection molded were removed from the mold, mold releasability and any deformation of the specimens were observed with the naked eye and graded A to D according to the same standards as in Example 1. The results of grading are shown in Table 3.

The following is the particulars of the components indicated in Table 3.

Polylactic acid: "#5400", available from Toyota Motor Corp.; polystyrene equivalent weight average molecular weight: 160,000 by GPC.

Talc: Fine talc powder "Microace P-6", available from Nippon Talc Co., Ltd.

Compound No. 3-1 (component (A)): 1,3,5-Tris(3,5-di-t-butyl-4-hydroxybenzyl)isocyanurate Compound No. 3-2 (component (A)): Tetrakis[methylene-3-(3',5'-di-t-butyl-4'-hydroxyphenyl)propionate]methane Compound 3-3 (component (A)): 1,3,5-Tris(3,5-di-t-butyl-4-hydroxybenzyl)-2,4,6-trimethylbenzene Compound No. 3-4 (component (B)): Adekastab CDA-6 (represented by formula shown below; melting point: 212° C.)

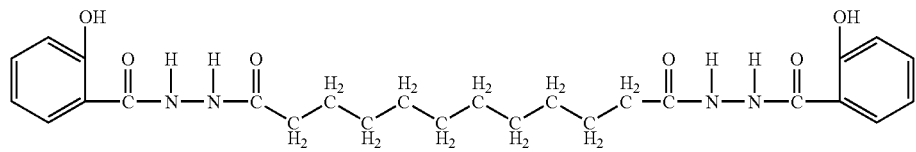

Compound No. 3-5 (component (B)): Phthalic hydrazide (melting point: >300° C.)

Compound No. 3-6 (Component (B)): Bis[3-(3,5-di-t-butyl-4-hydroxyphenyl)propionic acid] hydrazide (melting point: 228° C.)

TABLE 3

|  |  |  | Example | | | | | Comp. |
| --- | --- | --- | --- | --- | --- | --- | --- | --- |
|  |  |  | 3-1 | 3-2 | 3-3 | 3-4 | 3-5 | Ex. 3-1 |
| Composition | | Polylactic Acid | 100 | 100 | 100 | 100 | 100 | 100 |
|  | (A) | Compound No. 3-1 | 1 | 1 | 1 | 1 | 1 | 2 |
|  |  | Compound No. 3-2 |  | 1 |  |  |  |  |
|  |  | Compound No. 3-3 |  |  | 1 |  |  |  |
|  | (B) | Compound No. 3-4 | 1 | 1 | 1 |  |  |  |
|  |  | Compound No. 3-5 |  |  |  | 1 |  |  |
|  |  | Compound No. 3-6 |  |  |  |  | 1 |  |
|  |  | Talk | 1 | 1 | 1 | 1 | 1 | 1 |
| Tpc (° C.) | | | 124 | 126 | 125 | 126 | 123 | 117 |
| Crystallization Heat (J/g) | | | −42 | −41 | −42 | −44 | −40 | −39 |
| Mold Release and Deformation | | | B | B | B | B | B | D |

As is apparent from Table 3, the polylactic acid resin compositions of the invention containing the phenol antioxidant and specific amide compound have a high crystallization peak temperature and release a large amount of crystallization heat and therefore exhibit excellent molding properties in injection molding and undergo no deformation on removal from mold (Examples 3-1 to 3-5). In contrast, the comparative composition containing a phenol antioxidant but no component (B) has a crystallization peak temperature lower than 120° C. and a crystallization heat less than 40 J/g and exhibits poor molding properties (Comparative Example 3-1).

The present invention provides a polylactic acid resin composition showing a high rate of crystallization by adding a specific amide compound as a nucleating agent. The polylactic acid resin composition exhibits satisfactory moldability and provides a heat resistant molded article excellent in flexural strength and impact strength. The present invention also provides a convenient, efficient, and highly productive process for producing the heat resistant polylactic acid resin molded article by crystallizing the polylactic acid resin composition within a mold.

What is claimed is:

1. A polylactic acid resin composition comprising 100 parts by weight of a polylactic acid, (A) 0 to 10 parts by weight of a phenol antioxidant, and (B) 0.01 to 10 parts by weight of at least one amide compound of dodecanedioic acid bis(2-(2-hydroxybenzoyl)hydrazide).

2. The polylactic acid resin composition according to claim 1, wherein component (A) is present in an amount of 0.01 to 10 parts by weight.

3. The polylactic acid resin composition according to claim 1, wherein the amide compound has a melting point of 300° C. or higher.

4. The polylactic acid resin composition according to claim 1, which further comprises 0.01 to 40 parts by weight of magnesium silicate hydrate (talc).

5. The polylactic acid resin composition according to claim 4, wherein the magnesium silicate hydrate (talc) has an average particle size of 10 μm or smaller.

* * * * *